United States Patent
Wagener et al.

(10) Patent No.: US 8,531,756 B2
(45) Date of Patent: Sep. 10, 2013

(54) OPTICAL PROCESSING DEVICE

(75) Inventors: Jefferson Wagener, Morristown, NJ (US); Susumu Nakaya, Sakura (JP); Takaaki Ishikawa, Sakura (JP)

(73) Assignees: Nistica, Inc., Bridgewater, NJ (US); Fujikura Ltd., Tokyo (JP)

( * ) Notice: Subject to any disclaimer, the term of this patent is extended or adjusted under 35 U.S.C. 154(b) by 0 days.

(21) Appl. No.: 13/234,085

(22) Filed: Sep. 15, 2011

(65) Prior Publication Data
US 2013/0070328 A1 Mar. 21, 2013

(51) Int. Cl.
*G02B 26/00* (2006.01)
(52) U.S. Cl.
USPC ............................................................ 359/291
(58) Field of Classification Search
USPC ................. 359/290–292, 295, 298, 220, 223, 359/224, 320; 385/15, 16, 18, 9, 10, 36, 385/60, 72, 78
See application file for complete search history.

(56) References Cited

U.S. PATENT DOCUMENTS

| | | | | |
|---|---|---|---|---|
| 6,671,428 | B1 * | 12/2003 | Yang et al. | 385/18 |
| 6,842,549 | B2 * | 1/2005 | So | 385/15 |
| 6,934,069 | B2 * | 8/2005 | Moon et al. | 359/290 |
| 8,125,639 | B2 * | 2/2012 | Yoshida et al. | 356/328 |
| 2009/0028501 | A1 | 1/2009 | Wagener | |

\* cited by examiner

*Primary Examiner* — Tuyen Tra
(74) *Attorney, Agent, or Firm* — Stuart H. Mayer; Mayer & Williams PC

(57) ABSTRACT

A method and apparatus is provided for processing an optical beam. The method includes spatially dispersing an optical beam received from an optical port into a plurality of wavelength components. The wavelength components are focused and at least one of the components is selectively directed to one of the optical ports by reflecting the focused wavelength component at least twice from a DMD before being directed to a selected one of the optical ports. A resolution of the focused wavelength component is optimized when it is reflected from the DMD a first or second time at the expense of the other time when it is reflected.

17 Claims, 12 Drawing Sheets

OPTICAL PROCESSING DEVICE

TECHNICAL FIELD

The present invention relates to, for example, a wavelength-selective optical processing device.

BACKGROUND ART

Conventionally, an optical processing device has been used which includes a dispersion element (for example, a grating) dispersing a beam signal from an input path and an optical path conversion optical system allowing each of the dispersed beams to be incident to any of a plurality of output paths.

As such an optical path conversion optical system, a DMD (Digital Micromirror Device) is known that includes a plurality of micromirror elements, each of which is individually actuatable (for example, refer to Patent Document 1). The DMD may selectively switch an optical path of a reflected beam to any one of multiple output paths in a manner such that the directions of the mirror elements are adjusted to control the reflection direction of the beam.

SUMMARY OF THE INVENTION

Problem to be Solved by the Invention

However, since sufficient wavelength resolution has not been obtained according to the conventional optical processing device, there is a demand for an improvement in the wavelength resolution.

The present invention is made in view of such circumstances, and an object thereof is to provide an optical processing device having excellent wavelength resolution.

Means for Solving the Problem

An optical processing device according to the present invention includes: a beam emission portion which includes a plurality of optical fibers; a dispersion element which disperses a beam emitted from one optical fiber of the plurality of optical fibers; a condenser lens which focuses the beam passing through the dispersion element; an optical path conversion optical system which converts an optical path of the beam passing through the condenser lens so that the beam is incident to one of the other optical fiber of the plurality of optical fibers; and an optical path length adjustment portion which adjusts an optical path length of the beam incident from the optical path conversion optical system to said one of the other optical fiber, in which the optical path conversion optical system includes a mirror element which reflects the beam at a first reflection point and an intermediate mirror which reflects the beam reflected from the mirror element at an intermediate reflection point, the mirror element reflects the beam reflected from the intermediate mirror at a second reflection point, the condenser lens forms a focus of the beam at the first refection point, and the optical path length adjustment portion has a refractive index higher than that of air, and the beam is able to be transmitted therethrough.

The optical path length adjustment portion may be formed of silicon.

An area of a region including the mirror element as the second reflection point may be larger than that of a region including the mirror element as the first reflection point.

The optical path conversion optical system may allow the beams dispersed by the dispersion element to be incident to the plurality of different optical fibers in accordance with the wavelength of the beam.

Advantageous Effect of the Invention

According to the invention, since the focal position of the beam is the first reflection point, the wavelength resolution can be improved.

EMBODIMENTS FOR CARRYING OUT THE INVENTION

Hereinafter, an optical processing device according to an embodiment of the present invention will be described with reference to the drawings.

Figure 1:
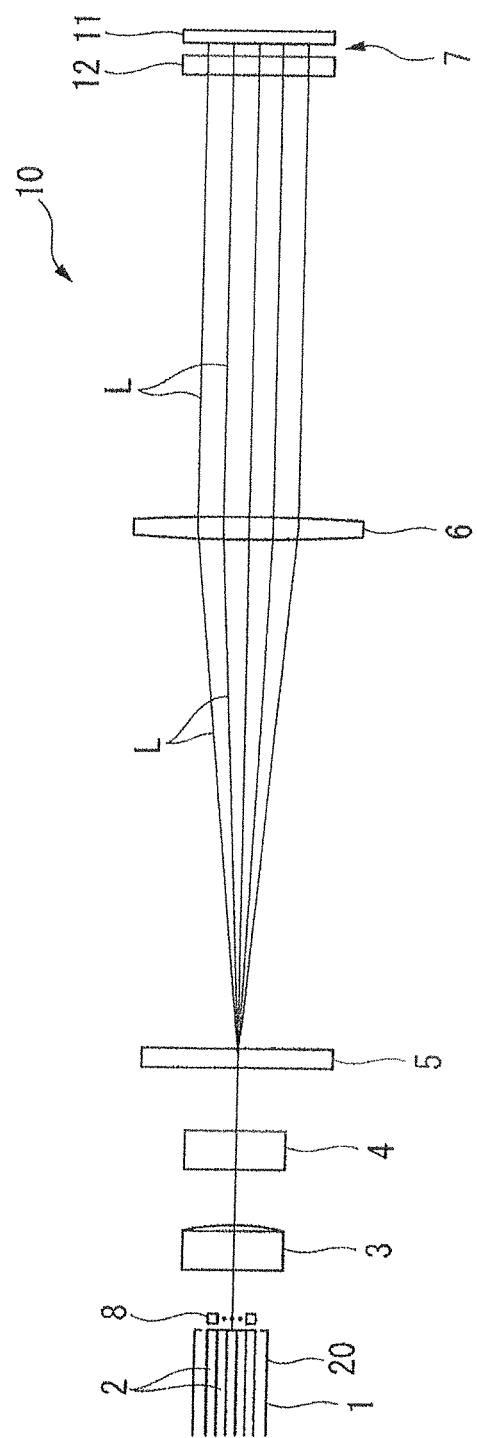
FIG. 1 is a schematic diagram illustrating an optical processing device according to an embodiment of the invention.
Figure 2:
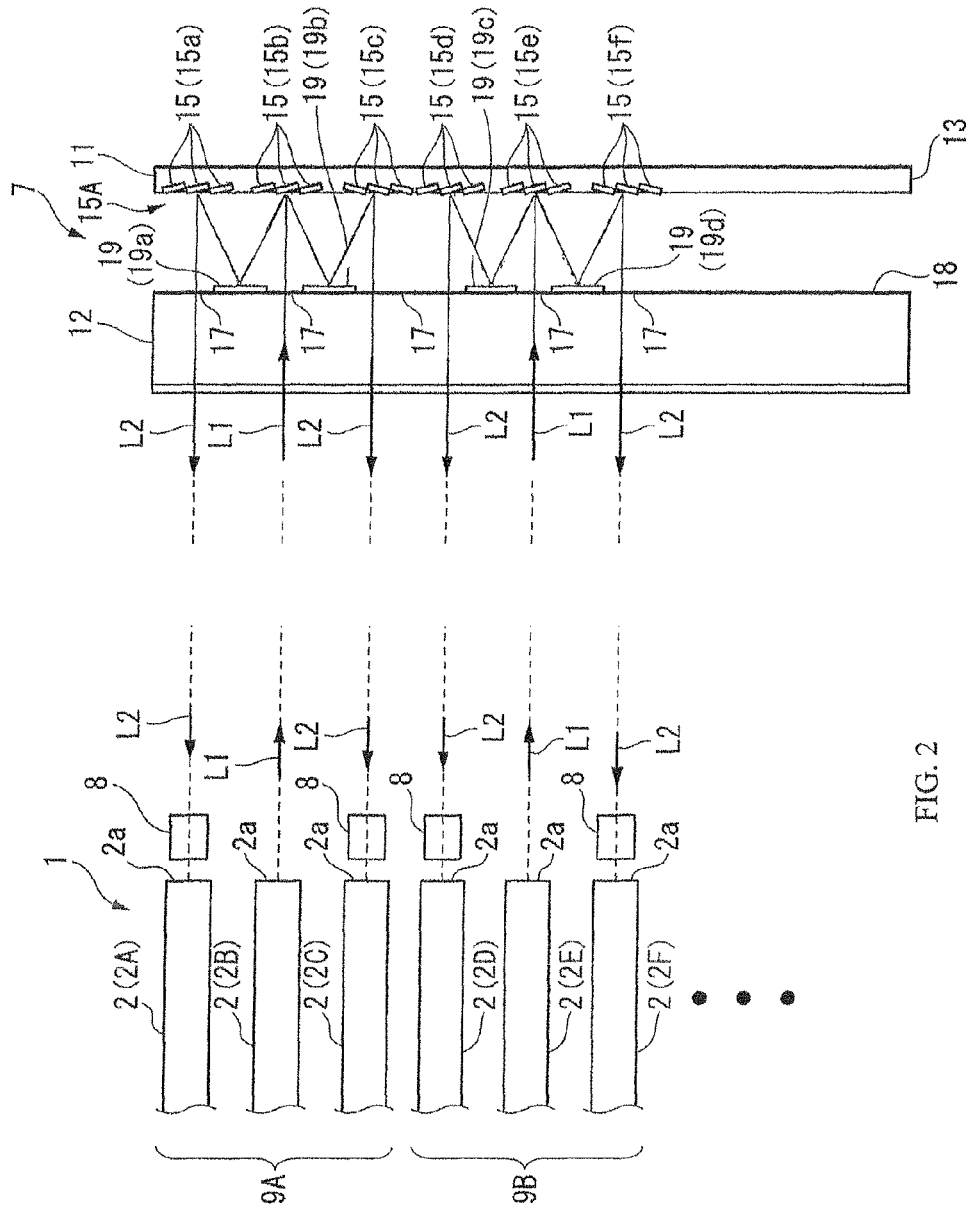
FIG. 2 is a schematic diagram illustrating an optical path conversion optical system and a front end portion of an optical fiber of the optical processing device of FIG. 1.
Figure 3:
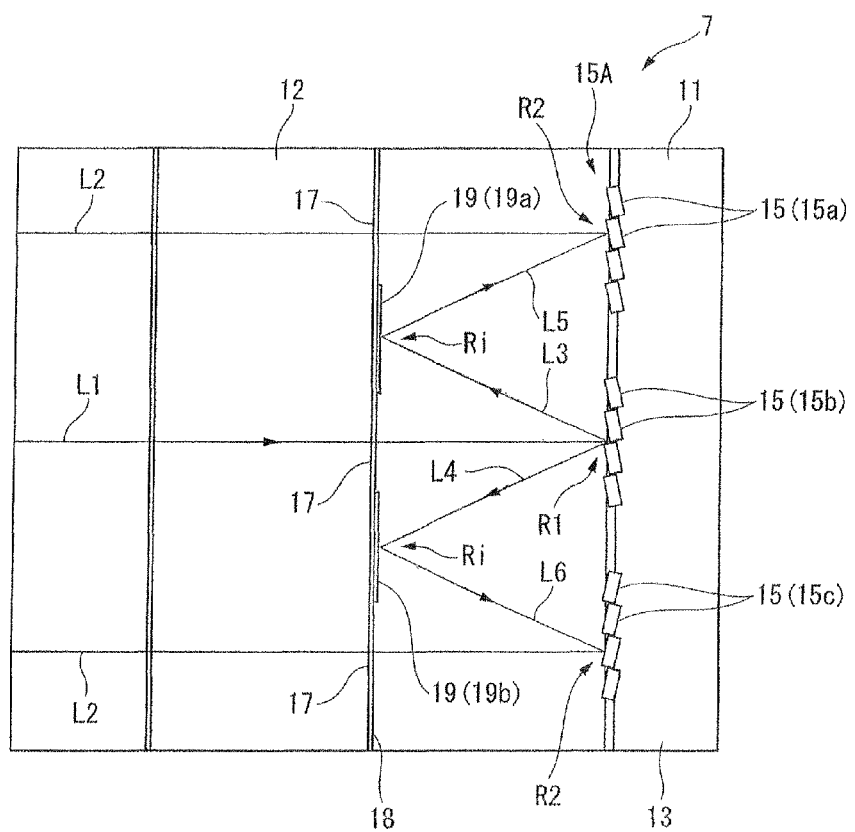
FIG. 3 is a schematic diagram illustrating the optical path conversion optical system of the optical processing device of FIG. 1.
Figure 4:
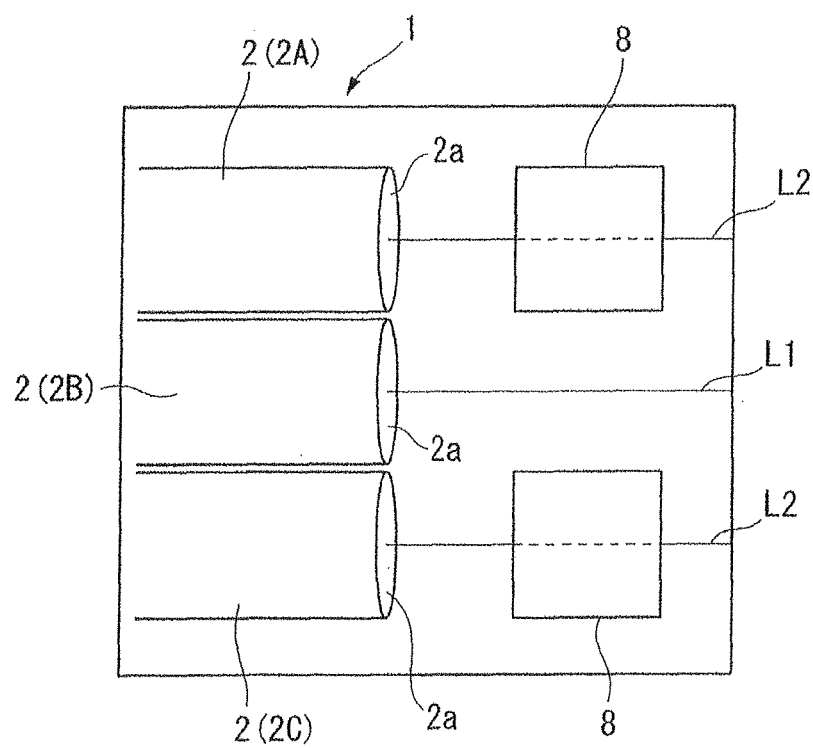
FIG. 4 is a schematic diagram illustrating the front end portion of the optical fiber of the optical processing device of FIG. 1.

FIG. 1 is a schematic diagram illustrating an optical processing device 10 according to an embodiment of the present invention. FIG. 2 is a schematic diagram illustrating an optical path conversion optical system 7 and a front end portion of an optical fiber 2 of the optical processing device 10. FIG. 3 is a schematic diagram illustrating the optical path conversion optical system 7 of the optical processing device 10. FIG. 4 is a schematic diagram illustrating a front end portion of the optical fiber 2 of the optical processing device 10.

As shown in FIG. 1, the optical processing device 10 includes: a beam emission portion 1 which includes a plurality of optical fibers 2; lens 3 and 4 (collimating lenses); a grating 5 (dispersion element) which disperses a beam passing through the lenses 3 and 4; a lens 6 (scan lens) (condenser lens) which focuses a beam passing through the grating 5; the optical path conversion optical system 7 which converts an optical path of the beam passing through the lens 6; and an optical path length adjustment portion 8 which adjust an optical path length of the beam.

As shown in FIGS. 1 and 2, the beam emission portion 1 includes a plurality of optical fibers 2 that propagate a beam input to and output from an external device and a holding portion 20 which holds the fibers arranged in a line in the width direction. As the beam emission portion 1, for example, a beam emission portion having an optical fiber array may be used.

As shown in FIG. 2, the optical fiber 2 (2A to 2F) may include a plurality of optical fiber groups 9 (9A and 9B).

The optical fiber groups 9 include a plurality of optical fibers 2 that is capable of being optically coupled with each other. In the example shown in the drawing, the optical fibers 2A to 2C constitute a first optical fiber group 9A, and the optical fibers 2D to 2F constitute a second optical fiber group 9B. In the example shown in the drawing, each of the optical fiber groups 9 includes three optical fibers 2, but the present invention is not limited thereto. For example, the optical fiber group may include two or more optical fibers 2.

In the optical fiber group 9A, the optical path of a beam L1 emitted from the optical fiber 2B (input path) may be converted by the optical path conversion optical system 7, so that the beam may be incident as a returned beam L2 to the optical fibers 2A and 2C (output paths). In the optical fiber group 9B, the optical path of a beam L1 emitted from the optical fiber 2E (input path) may be converted by the optical path conversion optical system 7, so that the beam may be incident as a returned beam L2 to the optical fibers 2D and 2F (output paths).

It is desirable that the front end surface 2a of the optical fiber 2 as the input path and the front end surface 2a of the optical fiber 2 as the output path be located at the same position in the optical path direction. In the example shown in the drawing, the front end surfaces 2a of all optical fibers 2 (2A to 2F) are located at the same position in the optical path direction.

The grating 5 may disperse the beam L (beam L1) emitted from the optical fiber 2 into multiple beams having different wavelengths. There is wavelength dependency in the beam emission direction of the grating 5, and it is desirable that the grating 5 sets different beam incident positions for each wavelength with respect to the optical path conversion optical system 7.

The lens 6 (scan lens) focuses the emitted beam L1 passing through the grating 5, and may form a focus inside the optical path conversion optical system 7.

The lens 6 (scan lens) collimates multiple beams having different wavelengths.

As shown in FIGS. 2 and 3, the optical path conversion optical system 7 converts the optical path of the beam L1 emitted from one optical fiber 2 of the plurality of optical fibers 2, so that the beam is incident as the returned beam L2 (beam L) to the other optical fiber 2.

The optical path conversion optical system 7 includes a body portion 11 and an intermediate reflection portion 12 which is installed at the returning direction side of the body portion 11 (the left side in FIGS. 2 and 3) with a gap with respect to the body portion 11.

The body portion 11 includes a support portion 13 and a plurality of mirror elements 15 (15a, 15b, 15c, . . . ) which are installed at the surface on the returning direction side of the support portion 13. The mirror elements 15 may be disposed in parallel in an area along the surface on the returning direction side of the support portion 13, thereby forming a mirror element assembly 15A.

The inclination of each of the mirror elements 15 is adjustable, and when the reflection direction of the beam is controlled by adjusting the inclination, the optical path of the reflected beam can be set.

As the body portion 11, a DMD (Digital Micromirror Device) having a plurality of micromirror elements, each of which is individually actuatable, may be used.

The intermediate reflection portion 12 includes a frame 18 which has a plurality of window portions 17 allowing beams to pass therethrough and a plurality of intermediate mirrors 19 (19a to 19d) installed in the frame 18.

The intermediate mirrors 19 are installed at the surface on the emission direction (the right side in FIGS. 2 and 3) of the frame 18 so that the beam reflected from the mirror elements 15 is reflected toward another mirror element 15. The intermediate mirrors 19 are installed with an interval in the vertical direction in FIGS. 2 and 3. In the example shown in the drawing, each window portion 17 is formed between the intermediate mirrors 19 which are adjacent to each other in the vertical direction.

The optical path conversion optical system 7 converts the optical paths of the beams dispersed by the grating 5 into different optical paths in accordance with the mirror elements 15, so that the returned beam L2 can be incident to any one of the optical fibers 2.

For example, the returned beam L2 may be incident to the different optical fiber 2 in accordance with each wavelength. For this reason, the optical path conversion optical system 7 may function as a switch optical system. In this case, the optical processing device 10 functions as a wavelength-selective switch.

Since the optical path conversion optical system 7 may control the direction of the beam so as not to incident to the optical fiber 2, the optical path conversion optical system may select whether the beam of each wavelength is individually incident to one of the other optical fibers 2 or is not incident to any of the other optical fibers 2.

For this reason, the optical path conversion optical system 7 may also function as a block optical system. In this case, the optical processing device 10 functions as a wavelength blocker.

The optical path conversion optical system 7 may convert the optical path so that the beam is incident to the optical fiber 2 by attenuating the beam of each wavelength with a predetermined attenuation rate. For example, a beam of a predetermined wavelength may be incident to the optical fiber 2 while attenuating the beam by adjusting the reflection amount using the mirror elements 15.

For this reason, the optical path conversion optical system 7 may also function as a filter optical system. In this case, the optical processing device 10 functions as a wavelength filter.

As shown in FIGS. 2 and 4, the optical path length adjustment portion 8 is formed of a material through which a beam is transmitted and which has a refractive index higher than that of air. For example, silicon (Si) (refractive index of 3.5), SiO$_2$ (refractive index of 1.45), SiON (refractive index of 1.5), or the like may be used. Particularly, when Si having a large refractive index is used, the dimension of the optical path length adjustment portion 8 in the optical path direction can be decreased, which is desirable in that the interruption of the beam incident to or emitted from another optical fiber 2 can be prevented.

The shape of the optical path length adjustment portion 8 is not particularly limited, and may be, for example, a cylindrical shape or a rectangular parallelepiped shape in the optical axis direction of the optical fiber 2.

The optical path length adjustment portion 8 may be installed at a position facing the front end surface 2a of the optical fiber 2 as the output path so that the returned beam L2 is incident thereto. Since the optical path length adjustment portion 8 is not installed at a surface facing the front end surface 2a of the optical fiber 2 as the input path, the emitted beam L1 may not pass through the optical path length adjustment portion 8.

In the example shown in FIG. 2, the optical path length adjustment portion 8 is installed at a position facing each of the front end surfaces 2a of the optical fibers 2A, 2C, 2D, and 2F being the output paths among the optical fibers 2A to 2F, and is not installed at a position facing each of the front end surfaces 2a of the optical fibers 2B and 2E being the input paths.

The optical path length of the returned beam L2 may be adjusted by allowing the emitted beam L1 not to pass through the optical path length adjustment portion 8, and allowing the returned beam L2 to pass through the optical path length adjustment portion 8.

In addition, the installation position of the optical path length adjustment portion 8 is not limited to the example shown in the drawing as long as the optical path length of the returned beam L2 can be adjusted, and may be located at other positions, for example, the vicinity of the optical path conversion optical system 7.

As shown in FIGS. 1 and 2, the beam propagated inside the optical fiber 2 and the beam L1 emitted from the optical fiber 2 may be a wavelength multiplexed light containing multiple signal beams having different wavelengths.

The beam L1 emitted from the front end surface 2a of the optical fiber 2 is collimated by the lenses 3 and 4 (collimating lenses), and then is dispersed into multiple beams having different wavelengths by the grating 5.

The dispersed emitted beams L1 travels toward the optical path conversion optical system 7 while being focused by the lens 6 (scan lens).

As shown in FIGS. 2 and 3, in the optical path conversion optical system 7, the emitted beam L1 passes through each window portion 17 of the intermediate reflection portion 12 and arrives at each mirror element 15, and the beam reflected from the mirror element 15 travels toward the intermediate mirror 19.

For example, as shown in FIG. 3, the beam L1 emitted from the optical fiber 2B is reflected by the mirror element 15b, and then the reflected beams L3 and L4 having different wavelengths may respectively travel toward the intermediate mirrors 19a and 19b. The point where the emitted beam L1 is initially reflected by the mirror element 15 is referred to as a first reflection point R1 (refer to FIG. 3). In the example, the first reflection point R1 is the mirror element 15b.

The reflected beams L3 and L4 are respectively reflected by the intermediate mirrors 19a and 19b, the reflected beams L5 and L6 respectively travel toward the mirror elements 15a and 15c to be reflected by the mirror elements 15a and 15c, and then the reflected beam (returned beam L2) passes through the window portion 17 of the intermediate reflection portion 12 to travel toward the optical fibers 2A and 2C (output path) (refer to FIG. 2).

As shown in FIG. 3, the point where the beams L3 and L4 are reflected by the intermediate mirror 19 (19a and 19b) is referred to as an intermediate reflection point Ri.

The point where the beams L5 and L6 reflected from the intermediate mirror 19 are reflected by the mirror element 15 is referred to as a second reflection point R2. In the example, the second reflection point R2 is the mirror elements 15a and 15c.

Figure 5:
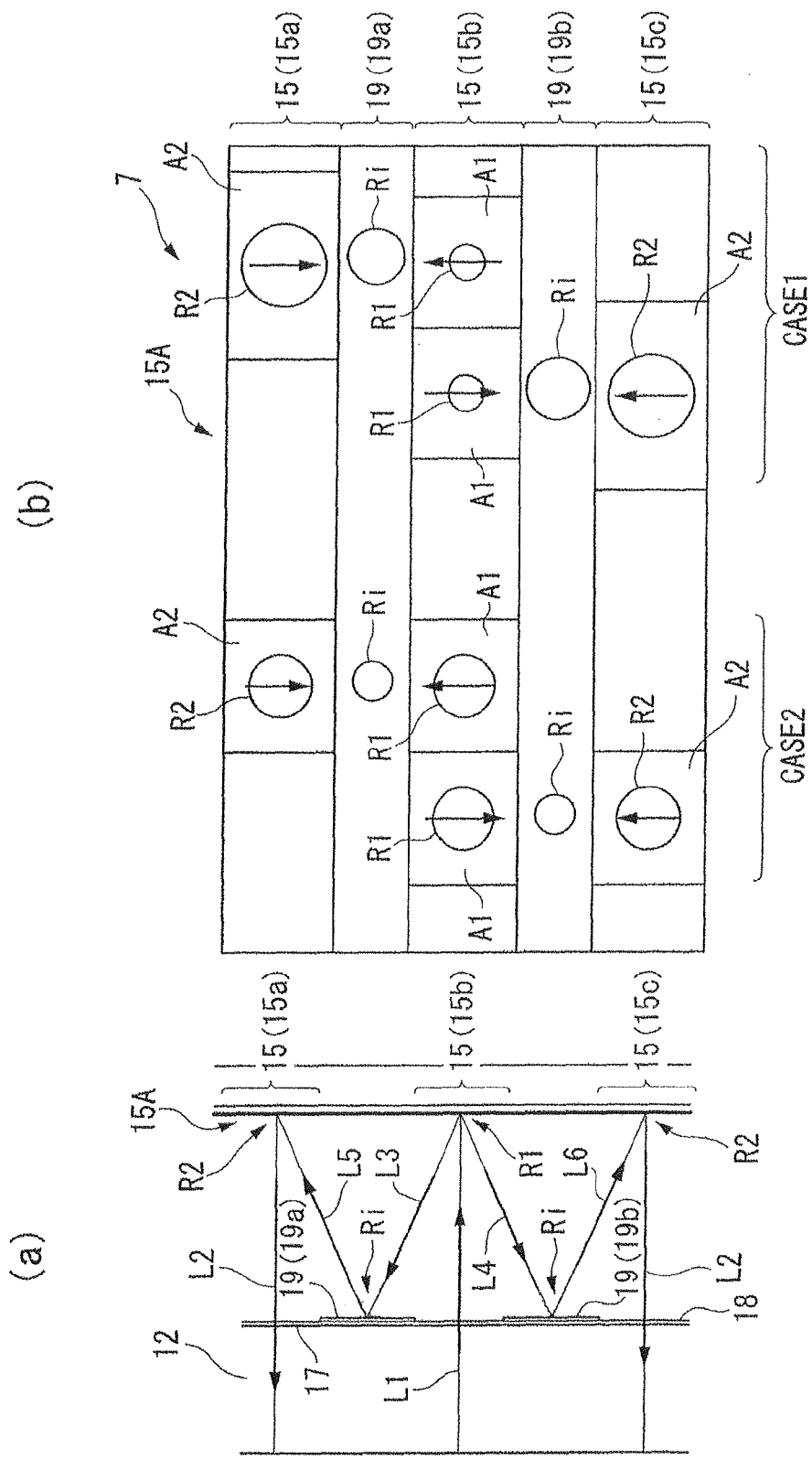
FIG. 5 is a diagram schematically illustrating the optical path conversion optical system of the optical processing device of FIG. 1, where (a) is a diagram thereof when seen from the side thereof and (b) is a plan view thereof.
Figure 6:
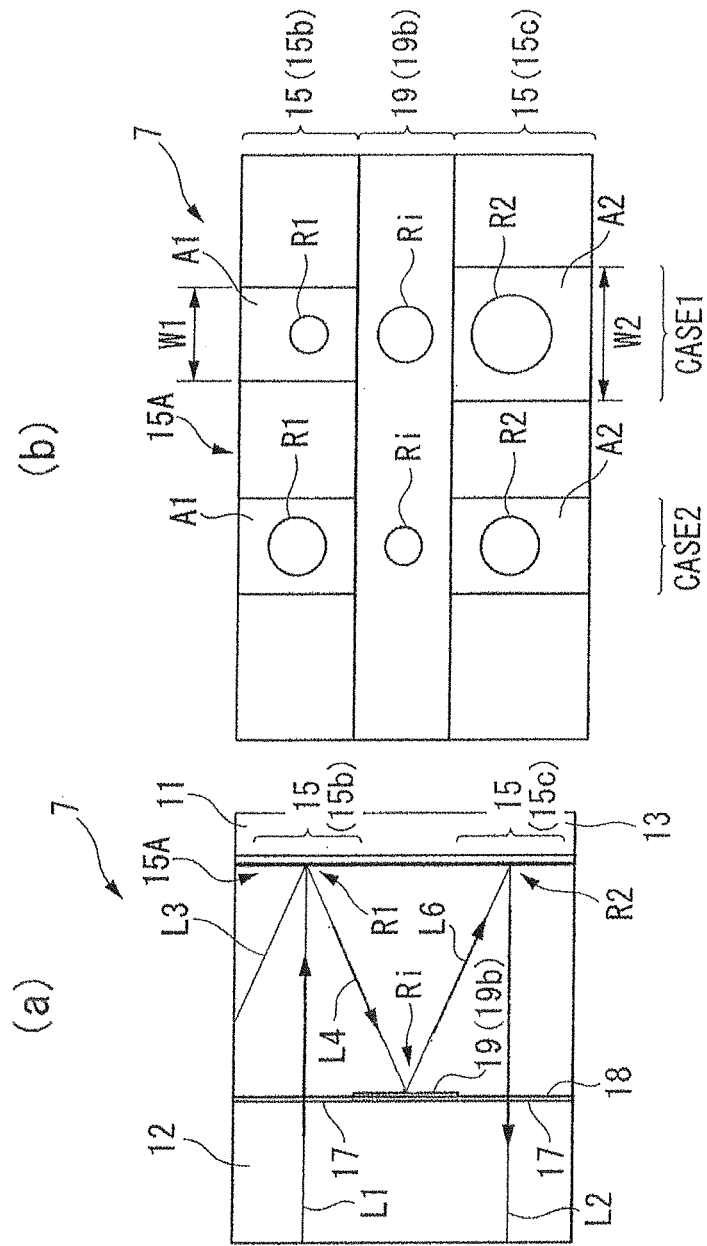
FIG. 6 is a diagram schematically illustrating a main part of the optical path conversion optical system of the optical processing device of FIG. 1, where (a) is a diagram thereof when seen from the side thereof and FIG. (b) is a plan view thereof.

FIG. 5 is a diagram schematically illustrating the optical path conversion optical system 7, where (a) is a diagram thereof when seen from the side thereof and (b) is a plan view thereof. FIG. 6 is a diagram illustrating a main part of the optical path conversion optical system 7, where (a) is a diagram thereof when seen from the side thereof and (b) is a plan view thereof.

As shown in FIG. 5(a), the emitted beam L1 passing through the lens 6 (scan lens) (refer to FIG. 1) is reflected by the mirror element 15 (15b) (first reflection point R1) to travel toward the intermediate mirror 19, is reflected by the intermediate mirror 19 (19a and 19b) (intermediate reflection point Ri), and is reflected again by the mirror element 15 (15a and 15c) (second reflection point R2) to be formed as the returned beam L2.

In the optical processing device 10, the focal position of the emitted beam L1 is not the intermediate reflection point Ri, but the first reflection point R1.

Since the focal position is dependent on the optical characteristics of the lens 6, the focal position may be aligned to the first reflection point R1 by selecting the lens 6 having optimal characteristics. Further, the focal position may be optimized by adjusting the position of the lens 6 (scan lens) (refer to FIG. 1) in the optical path direction.

Since the focal position of the emitted beam L1 is set to the first reflection point R1, the beam diameter of the emitted beam L1 at the first reflection point R1 decreases, whereby the wavelength resolution may be improved.

The reason why the wavelength resolution is improved by setting the focal position to the first reflection point R1 is because the reflection loss can be suppressed to be small such that the beam diameter is small when the emitted beam L1 is initially reflected by the mirror element 15, whereby the precision of dividing the beam for each wavelength is improved.

Accordingly, when the focal point is formed at the intermediate reflection point Ri as an intermediate point in the reciprocation path from the optical fiber 2 to the optical fiber 2 through the optical path conversion optical system 7, the beam is defocused at the first reflection point R1, and therefore, sufficient wavelength resolution is difficult to obtain.

Further, the focal position may not be accurately set to the first reflection point R1, but may be located at a position deviated from the first reflection point R1 in the optical path direction. That is, the focal position may be set to the first reflection point R1 or the vicinity thereof.

FIG. 5(b) is a diagram schematically illustrating the direction of the beam and the plane arrangement of the mirrors of the optical path conversion optical system 7. In the drawing, the arrow indicates the inclination direction of the mirror element 15 (refer to FIG. 3). Specifically, an upward arrow indicates that the mirror element 15 faces obliquely upward in FIG. 3, and the downward arrow indicates that the mirror element 15 faces obliquely downward in FIG. 3.

For example, in each of a region A1 of the mirror element assembly 15A including the first reflection point R1 and a region A2 of the mirror element assembly 15A including the second reflection point R2, all mirror elements 15 face the direction depicted by the arrow (obliquely upward or obliquely downward).

As shown in FIG. 5B, when the focal position of the emitted beam L1 is set to the first reflection point R1 (CASE 1), the beam diameter at the first reflection point R1 becomes smaller than that of the case where the focal position is set to the intermediate reflection point Ri (CASE 2). In CASE 1, the beam diameters at the intermediate reflection point R1 and the second reflection point R2 become larger than those of CASE 2.

As shown in FIGS. 5(b) and 6(b), since the beam diameter at the second reflection point R2 increases, it is desirable that the region A2 including the mirror element 15 (15a and 15c) as the second reflection point R2 be set to be larger than that of the region A2 in CASE 2.

In the example shown in the drawing, the width W2 (the dimension in the transverse direction of FIG. 6(b)) of the region A2 including the mirror element 15 (15a and 15c) as the second reflection point R2 is set to be larger than the width W1 of the region A1 including the mirror element 15 (15b) as the first reflection point R1. For this reason, the area of the region A2 becomes wider than that of the region A1.

Accordingly, the loss of the beam at the second reflection point R2 can be reduced and therefore the degradation of the wavelength resolution can be prevented.

Hereinafter, setting the width W2 of the region A2 to be larger than the width W1 of the region A1 is referred to as widening.

Figure 9:
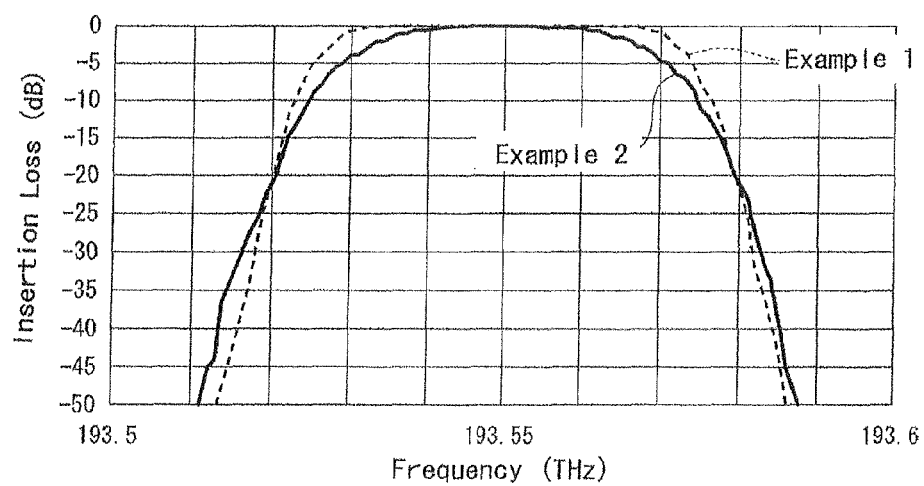
FIG. 9 is a graph illustrating a test result.

FIG. 9 illustrates the output characteristics when the widening is performed and is not performed. In the example 2, as shown in CASE 2 of FIG. 6(b), the width of the region A2 was set to be equal to the width of the region A1. In the example 1, as shown in CASE 1, the width (W2) of the region A2 was set to be larger than the width (W1) of the region A1.

As understood from FIG. 9, excellent output characteristics were obtained in the example 1 where the widening is performed.

As shown in FIGS. 1 and 2, the returned beam L2 is collimated by the lens 6, is focused by the lenses 3 and 4, passes through the optical path length adjustment portion 8, and then is incident to the front end surface 2a of the optical fiber 2. In the examples shown in FIGS. 2 and 4, the returned beam L2 passes through the optical path length adjustment portion 8, and is incident to the optical fibers 2A, 2C, 2D, and 2F.

As described above, since the focal position of the emitted beam L1 is set to the first reflection point R1, the length (the length of the actual optical path) of the optical path of the beam (the reflected beams L3 to L6 and the returned beam L2) after the first reflection point R1 is longer than the length of the optical path of the emitted beam L1.

In the optical processing device 10, the optical path length (the length of the optical path) of the returned beam L2 is adjusted by providing the optical path length adjustment portion 8. For this reason, the optical path length of the beam (the reflected beams L3 to L6 and the returned beam L2) after the first reflection point R1 can be optimized in accordance with the optical path length of the emitted beam L1.

Accordingly, it is possible to prevent degradation (for example, increasing insertion loss) of the optical characteristics accompanied by setting the focal position to the first reflection point R1.

Figure 10:
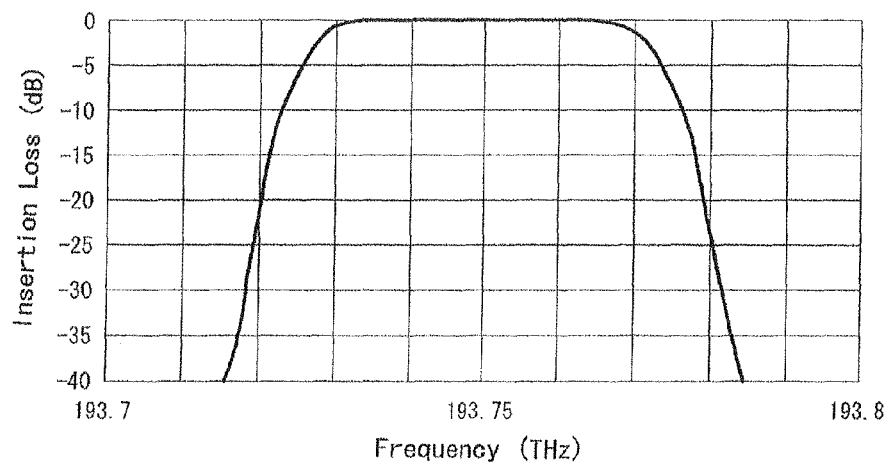
FIG. 10 is a graph illustrating a test result.
Figure 11:
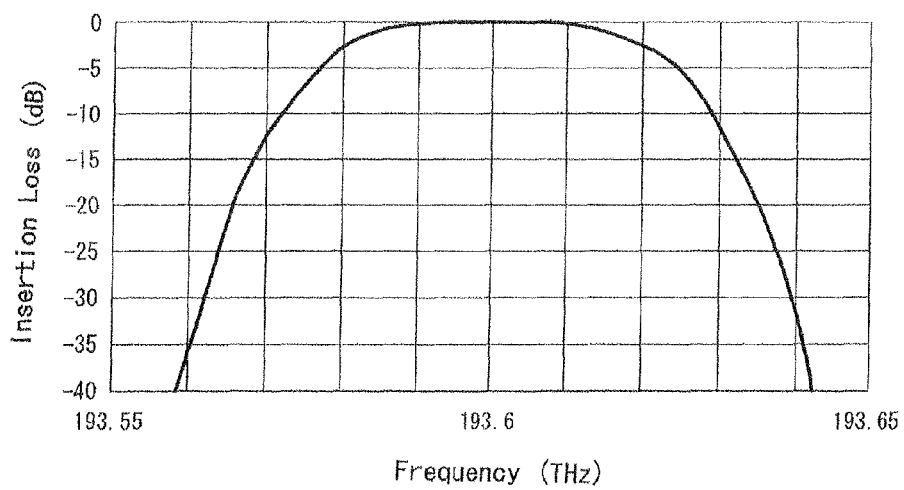
FIG. 11 is a graph illustrating a test result.

FIGS. 10 and 11 are graphs illustrating the output characteristics when the optical path length adjustment portion 8 is installed and is not installed.

As shown in FIG. 10, when the optical path length adjustment portion 8 (having a length of 200 mm in the optical path direction) formed of Si is provided, excellent output characteristics are obtained as compared to the case where the optical path length adjustment portion 8 shown in FIG. 11 is not provided.

In addition, if the front end position of the optical fiber 2 being the input path and the front end position of the optical fiber 2 being the output path are shifted in the optical path direction, the optical path length of the beam (the reflected beams L3 to L6 and the returned beam L2) after the first reflection point R1 may be adjusted in accordance with the optical path length of the emitted beam L1.

Figure 7:
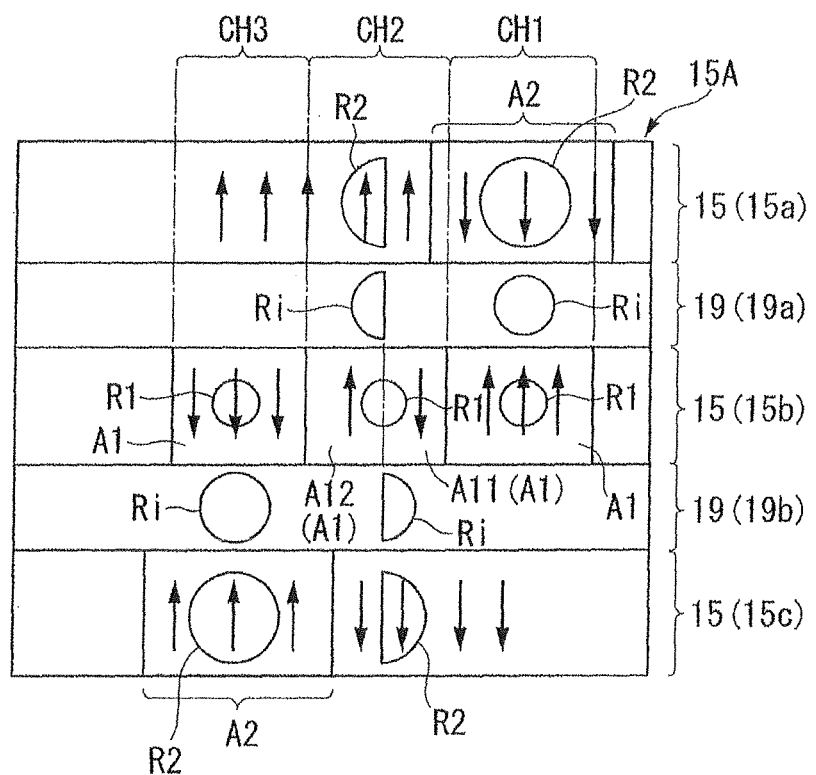
FIG. 7 is a plan view schematically illustrating the optical path conversion optical system of the optical processing device of FIG. 1.

FIG. 7 is a plan view illustrating an example of a method of using the optical path conversion optical system 7.

In this example, three channels CH1 to CH3 adjacent to each other are provided. In the first channel CH1, the returned beam L2 is incident to the optical fiber 2 (not shown) for the first channel. In the third channel CH3, the returned beam L2 is incident to the optical fiber 2 (not shown) for the third channel. In the second channel CH2 located between channels CH1 and CH3, the beam is not incident to any one of the optical fibers 2.

In the first channel CH1, the mirror element 15b faces obliquely upward and the mirror element 15a faces obliquely downward, whereby the reflected beam travels toward the optical fiber 2 for the first channel through the intermediate mirror 19a and the mirror element 15a.

In the third channel CH3, the mirror element 15b faces obliquely downward and the mirror element 15c faces obliquely upward, whereby the reflected beam travels toward the optical fiber 2 for the third channel through the intermediate mirror 19b and the mirror element 15c.

In the second channel CH2, the mirror element 15 as the second reflection point R2 faces outward so that the beam is not incident to any one of the optical fibers 2. That is, when the mirror element 15a is used, the mirror element faces obliquely upward. When the mirror element 15c is used, the mirror element faces obliquely downward. Accordingly, the reflected beam does not travel toward the optical fiber 2.

However, as described above, in the channels CH1 and CH3, the widening is performed to increase the width of the region A2 including the mirror elements 15a and 15c being the second reflection point R2. Accordingly, if the mirror element 15 of the region including the second reflection point R2 is made to face a single direction in the second channel CH2, part of the beam of the second channel CH2 is directed to the area A2 of the channel CH1 or the channel CH3 in any direction, so that the beam is incident as a leakage beam to the optical fiber 2.

In order to avoid this, in the example, the region A1 including the mirror element 15 (15b) of the second channel CH2 is divided into a first channel side region A11 adjacent to the first channel CH1 and a third channel side region A12 adjacent to the third channel CH3.

In the first channel side region A11, the mirror element 15b faces the direction (obliquely downward) which is opposite to the direction of the mirror element 15b of the first channel CH1, whereby the reflected beam travels in the direction deviating from the optical fiber 2 through the intermediate mirror 19b and the mirror element 15c.

In the third channel side region A12, the mirror element 15b faces the direction (obliquely upward) which is opposite to the direction of the mirror element 15b of the third channel CH3, whereby the reflected beam travels in the direction deviating from the optical fiber 2 through the intermediate mirror 19a and the mirror element 15a.

Accordingly, the leakage beam may be prevented by preventing the beam of the channel CH2 from being directed to the region A2 in the channels CH1 and CH3.

Figure 12:
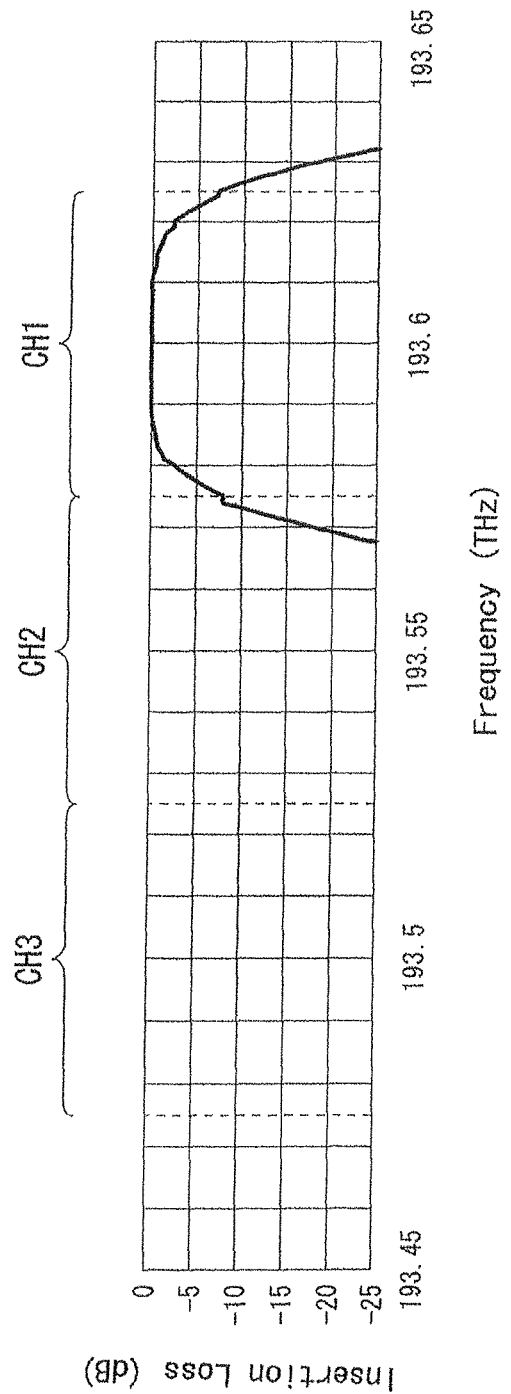
FIG. 12 is a graph illustrating a test result.
Figure 13:
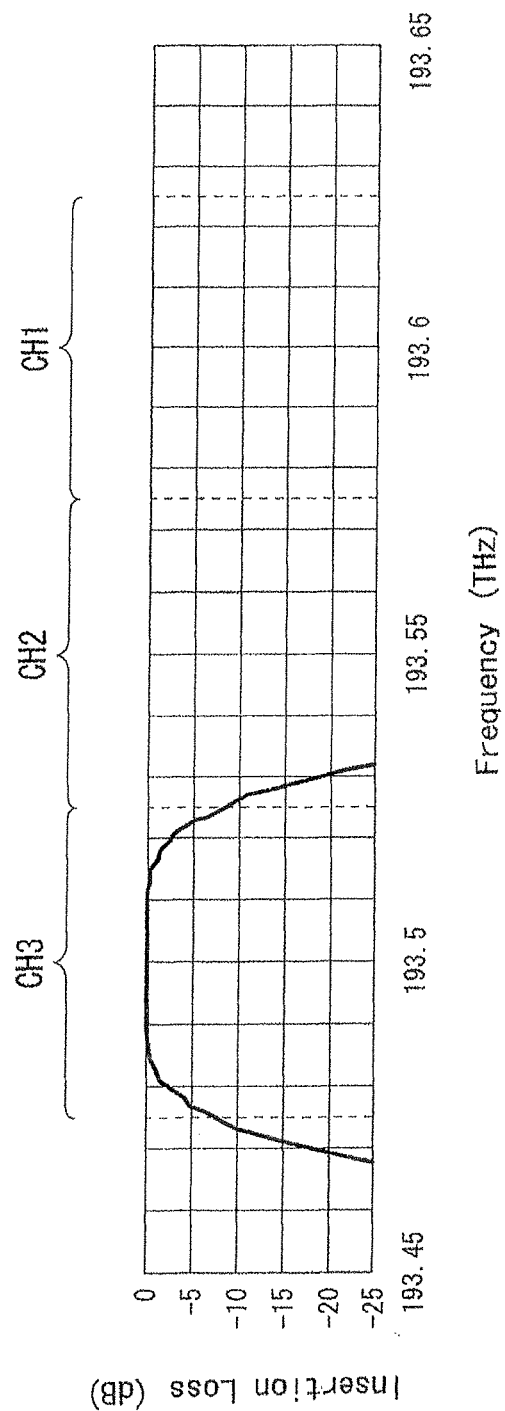
FIG. 13 is a graph illustrating a test result.

FIGS. 12 and 13 are graphs illustrating the output characteristics when the optical path conversion optical system 7 has a configuration shown in FIG. 7.

From these drawings, it is found that the output characteristics of the first channel CH1 (FIG. 12) and the output characteristics of the third channel CH1 (FIG. 13) become satisfactory.

Figure 8:
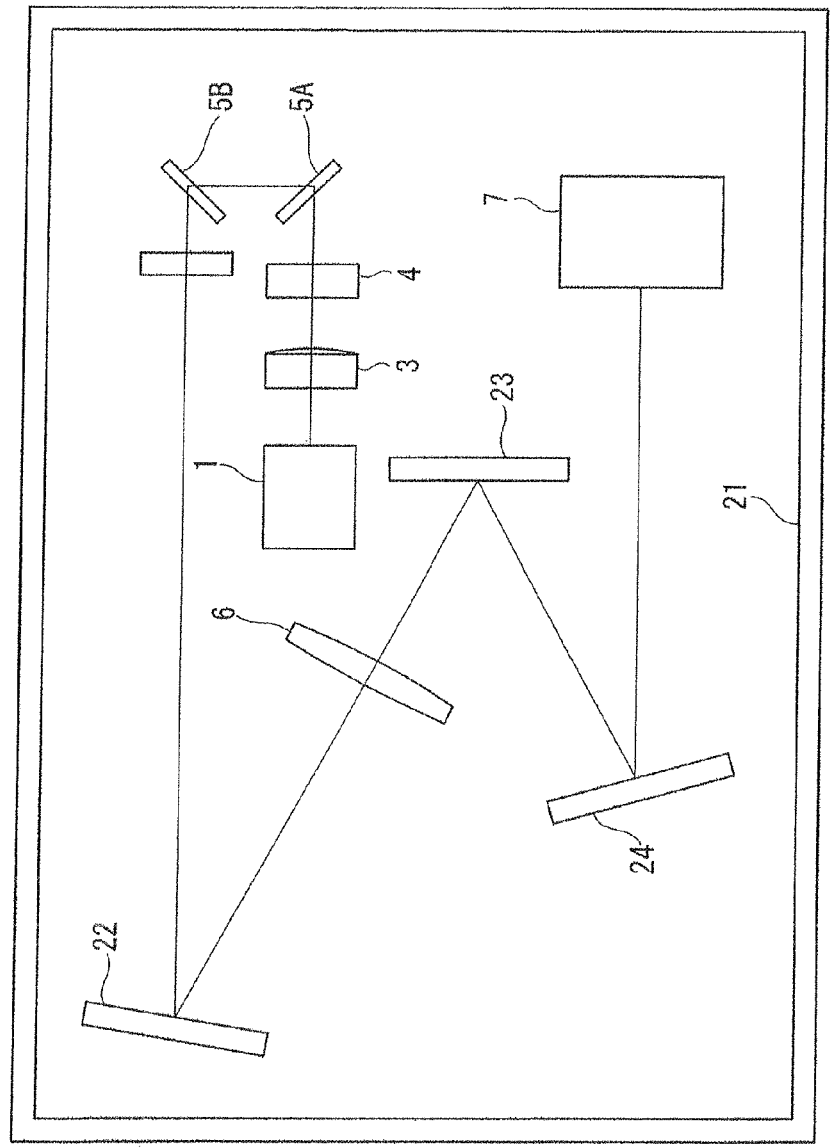
FIG. 8 is a configuration diagram illustrating an example of a specific configuration of the optical processing device of FIG. 1.

FIG. 8 illustrates an example of a specific configuration of the optical processing device 10. The optical processing device 10 shown in the drawing includes a case 21 that is provided with: the beam emission portion 1; the lens 3 and 4 (collimating lenses); the gratings 5A and 5B which disperse the beam from the lenses 3 and 4; the lens 6 (scan lens); the optical path conversion optical system 7; and the optical path length adjustment portion (not shown). The symbols 22 to 24 indicate the mirrors.

The number of the optical fibers of the beam emission portion 1 is not particularly limited, and may be arbitrarily, for example, three or more. Further, the number of the mirror elements of the optical path conversion optical system may be arbitrarily set to one or more. Furthermore, the number of times of reflecting the beam in the mirror element and the intermediate mirror is not limited to the above-described example.

DESCRIPTION OF SYMBOLS

1: BEAM EMISSION PORTION
2: OPTICAL FIBER
3, 4: LENS (COLLIMATING LENS)
5: GRATING (DISPERSION ELEMENT)
6: LENS (CONDENSER LENS)
7: OPTICAL PATH LENGTH CONVERSION OPTICAL SYSTEM
8: OPTICAL PATH LENGTH ADJUSTMENT PORTION
15: MIRROR ELEMENT
19: INTERMEDIATE MIRROR
L1: EMITTED BEAM
L2: RETURNED BEAM
R1: FIRST REFLECTION POINT
R2: SECOND REFLECTION POINT
Ri: INTERMEDIATE REFLECTION POINT
A1: AREA OF MIRROR ELEMENT ASSEMBLY INCLUDING FIRST REFLECTION POINT
A2: AREA OF MIRROR ELEMENT ASSEMBLY INCLUDING SECOND REFLECTION POINT

What is claimed is:

1. An optical processing device, comprising:
a plurality of optical ports;
a dispersion element for spatially dispersing an optical beam received from the optical ports into a plurality of wavelength components;
a lens arrangement for focusing the wavelength components received from the dispersion element;
an optical path conversion system for receiving the focused plurality of wavelength components from the lens arrangement and selectively directing at least one of the wavelength components to one of the optical ports, said optical path conversion system including a digital micromirror device (DMD) from which at least one wavelength component is reflected at least twice before being directed to a selected one of the optical ports, said DMD performing optical processing on the wavelength component when it is reflected from the DMD a first or second time; and
an optical path length compensator for adjusting an optical path length traversed by the wavelength component selectively directed to one of the optical ports to improve the optical processing performed on the wavelength component.

2. The optical processing device of claim 1 said wherein the optical processing that is performed includes amplitude filtering.

3. The optical processing device of claim 2 said wherein resolution of the amplitude filtering is improved by adjusting the optical path length.

4. The optical processing device of claim 3 wherein said DMD includes an array of individually actuatable mirror elements for selectively reflecting the wavelength components, and wherein the optical path conversion system further includes an optical element for receiving the reflected wavelength components from the DMD and directing them back onto selected ones of the mirror elements of the DMD, said lens arrangement focusing the plurality of wavelength components onto the mirror elements before or after they are received by the optical element.

5. The optical processing device of claim 4 wherein a beam diameter of each of the wavelength components directed onto the mirror elements before or after they are received by the optical element is smaller than a beam diameter of each of the wavelength components directed onto the optical element.

6. The optical processing device of claim 1 wherein the lens arrangement focuses the plurality of wavelength components onto the DMD.

7. The optical processing device of claim 1 wherein the optical path length compensator creates a different optical path length between wavelengths components received by one of the optical ports and directed to the optical path conversion system and wavelength components selectively directed from the optical path conversion system to a selected output.

8. The optical processing device of claim 1 wherein the lens arrangement includes a condenser lens.

9. The optical processing device of claim 8 wherein the optical element includes a plurality of planar mirrors having reflective surfaces that face reflective surfaces of the mirror elements of the DMD.

10. The optical processing device of claim 1 wherein the optical path conversion system is configured to selectively direct each of the wavelength components to a different one of the optical ports.

11. The optical processing device of claim 1 wherein the optical path length compensator comprises silicon.

12. The optical processing device of claim 1 wherein the optical path length compensator includes a plurality of optical elements each located in the optical path traversed by wavelength components selectively directed to one of the optical ports.

13. The optical processing device of claim 12 wherein the optical elements are located adjacent to selected optical ports.

14. The optical processing device of claim 13 wherein the optical path length compensator includes an anti-reflection coating.

15. The optical processing device of claim 1 wherein the optical path length compensator is configured to minimize reflections within the optical processing device.

16. The optical processing device of claim 15 wherein the optical path length compensator has an optical axis inclined with respect to an optical path traversed by the wavelength component.

17. A method for processing an optical beam, comprising:
spatially dispersing an optical beam received from an optical port into a plurality of wavelength components;
focusing the wavelength components;
selectively directing at least one of the focused wavelength components to one of the optical ports by reflecting the focused wavelength component at least twice from a DMD before being directed to a selected one of the optical ports; and optimizing a resolution of the focused wavelength component when it is reflected from the DMD a first or second time at the expense of the other time when it is reflected.

* * * * *